(No Model.) 10 Sheets—Sheet 3.
H. A. HOUSEMAN.
CIRCULAR KNITTING MACHINE.

No. 538,518. Patented Apr. 30, 1895.

Witnesses.
Jesse B. Heller
Philip Bouteljé

Inventor.
Harry A. Houseman
by
J. F. Harding
Attorney.

(No Model.) 10 Sheets—Sheet 5.
H. A. HOUSEMAN.
CIRCULAR KNITTING MACHINE.

No. 538,518. Patented Apr. 30, 1895.

Witnesses.
Jesse B. Heller
Philip Bouteje

Inventor.
Harry A. Houseman
by G. F. Heiding
Attorney.

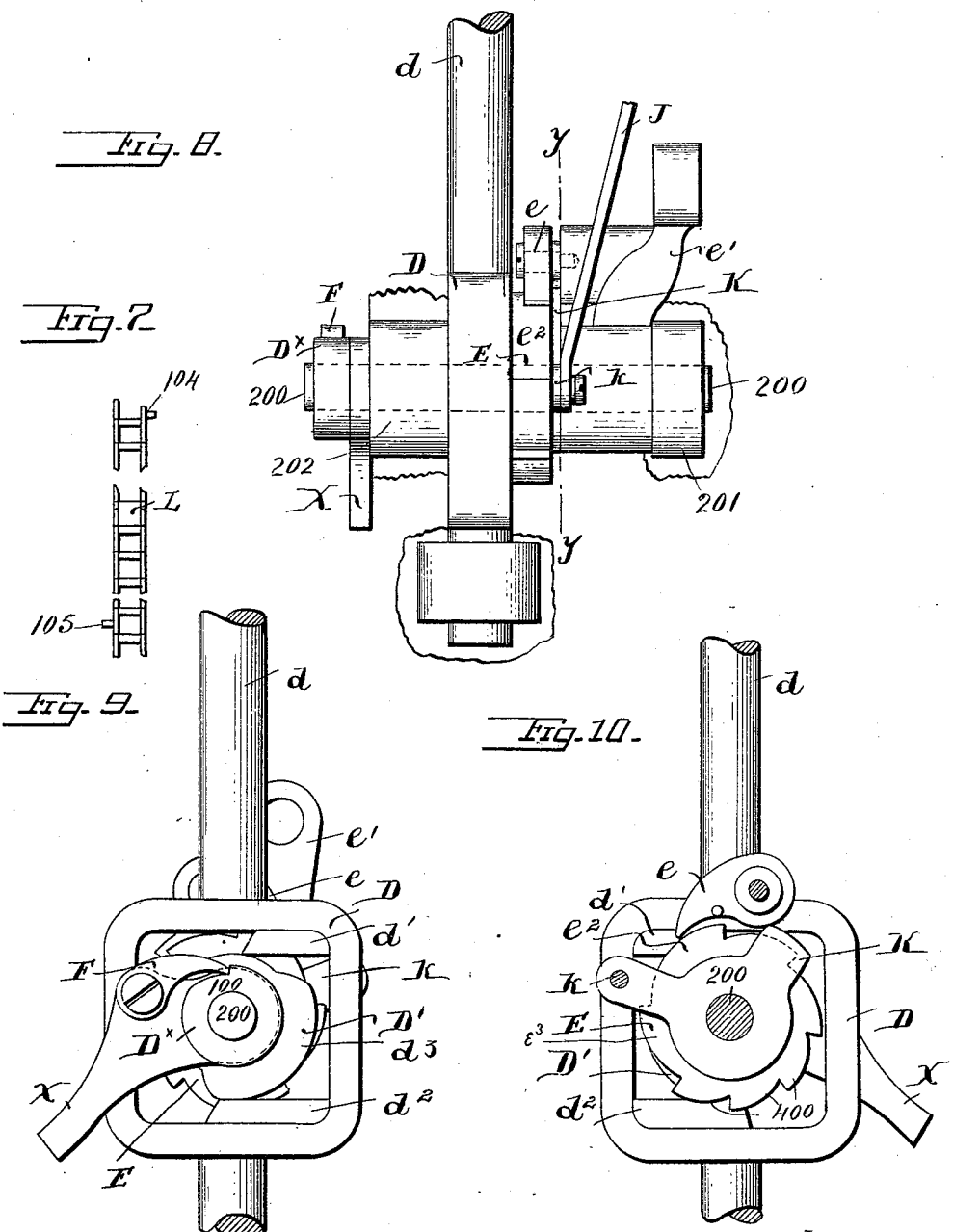

(No Model.) 10 Sheets—Sheet 7.
H. A. HOUSEMAN.
CIRCULAR KNITTING MACHINE.
No. 538,518. Patented Apr. 30, 1895.
Fig. 11.
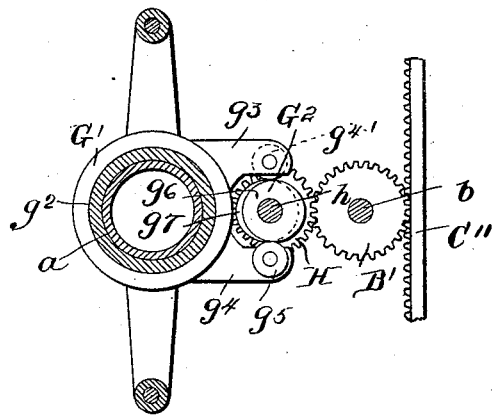
Fig. 12.
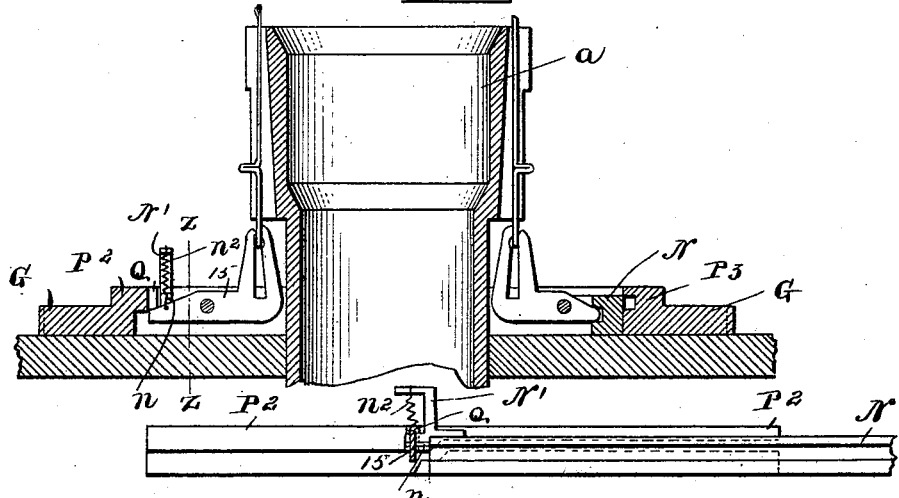
Fig. 13.
Witnesses. Inventor.

(No Model.)  H. A. HOUSEMAN.  10 Sheets—Sheet 8.
CIRCULAR KNITTING MACHINE.
No. 538,518.  Patented Apr. 30, 1895.
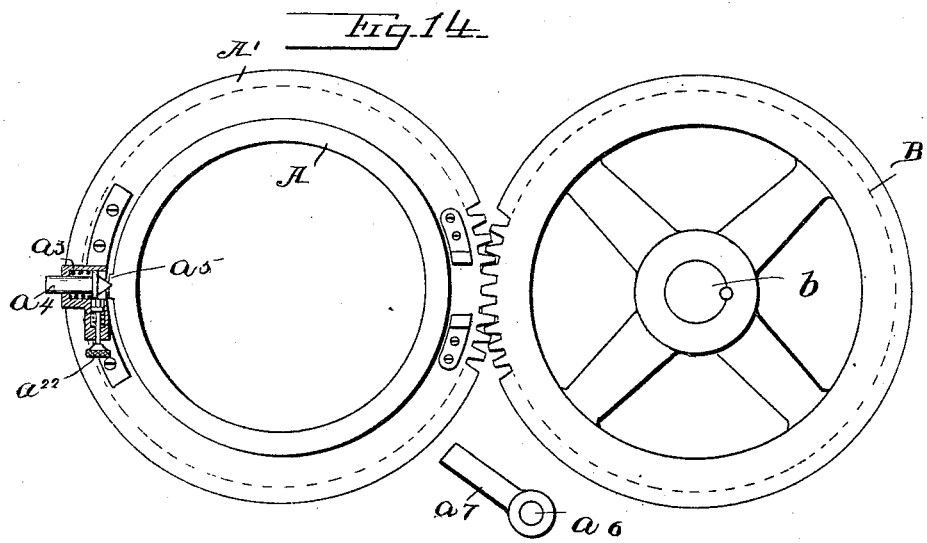
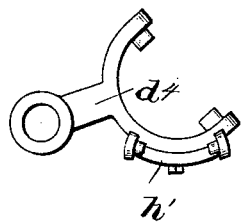
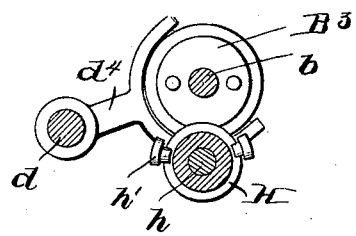
Witnesses.  Inventor.

(No Model.)
10 Sheets—Sheet 9.
H. A. HOUSEMAN.
CIRCULAR KNITTING MACHINE.
No. 538,518. Patented Apr. 30, 1895.
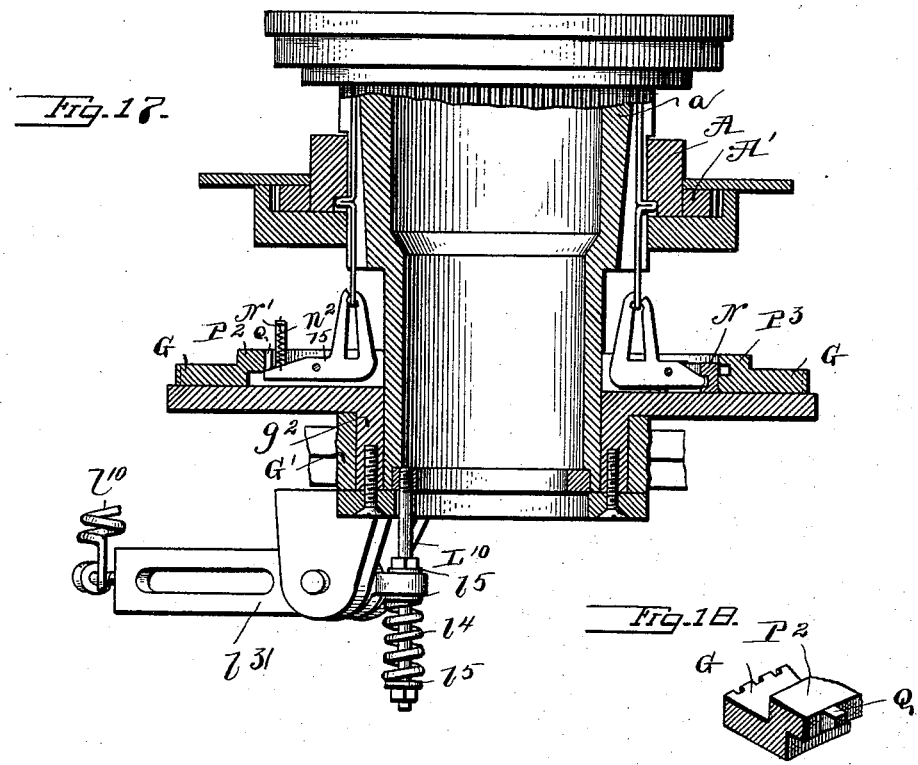
Witnesses.
Jesse B. Heller
Frances Ellis
Inventor.
Harry A. Houseman
Attorney.

(No Model.) 10 Sheets—Sheet 10.
H. A. HOUSEMAN.
CIRCULAR KNITTING MACHINE.
No. 538,518. Patented Apr. 30, 1895.
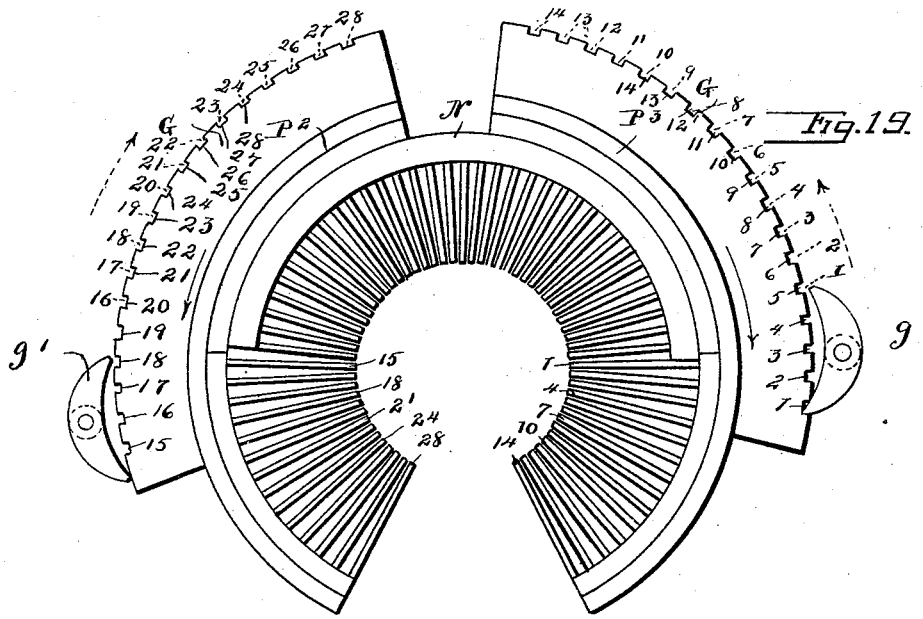
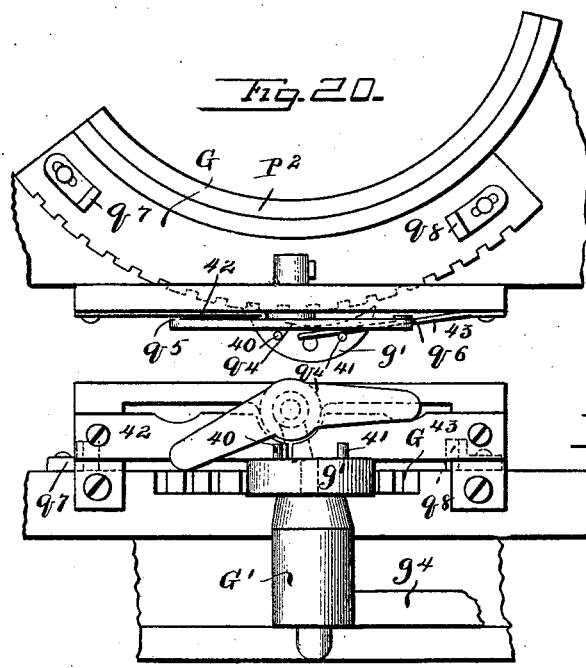
Witnesses.
Jesse B. Heller
Philip Boutelje
Inventor.
Harry A. Houseman
by J. P. Harding
Attorney.

UNITED STATES PATENT OFFICE.

HARRY A. HOUSEMAN, OF PHILADELPHIA, PENNSYLVANIA, ASSIGNOR TO THE STANDARD MACHINE COMPANY, OF SAME PLACE.

CIRCULAR-KNITTING MACHINE.

SPECIFICATION forming part of Letters Patent No. 538,518, dated April 30, 1895.

Application filed October 8, 1894. Serial No. 525,237. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Circular-Knitting Machines, of which the following is a full, clear, and exact description, reference being had to the accompanying drawings, which form a part of this specification.

My invention consists in certain improved constructions for the better and simpler operation of circular knitting machines to manufacture goods tubular at one portion and in which at another portion a part of the needles are thrown out of action, all of which will more clearly appear hereinafter in the description of the machine embodying my invention, and illustrated in the accompanying drawings.

Figure 1:
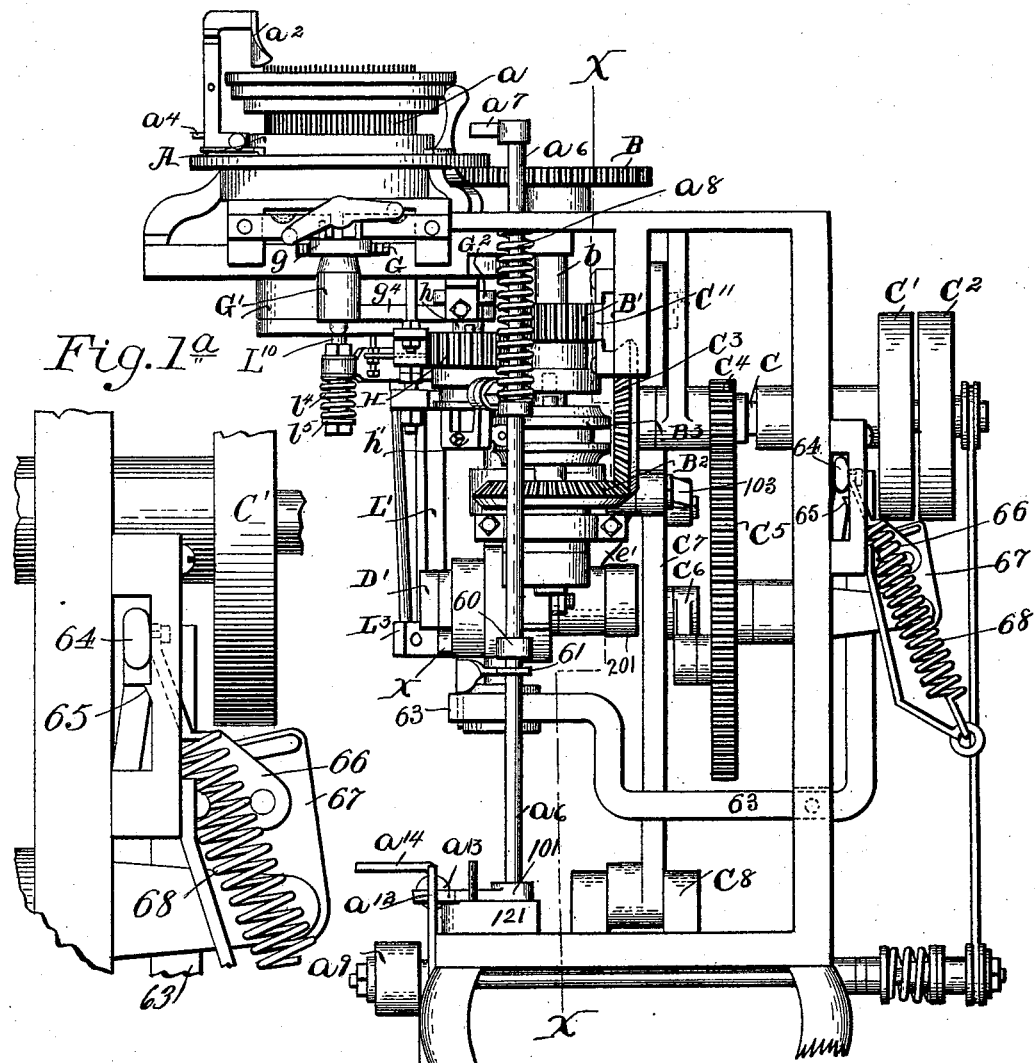
Figure 2:
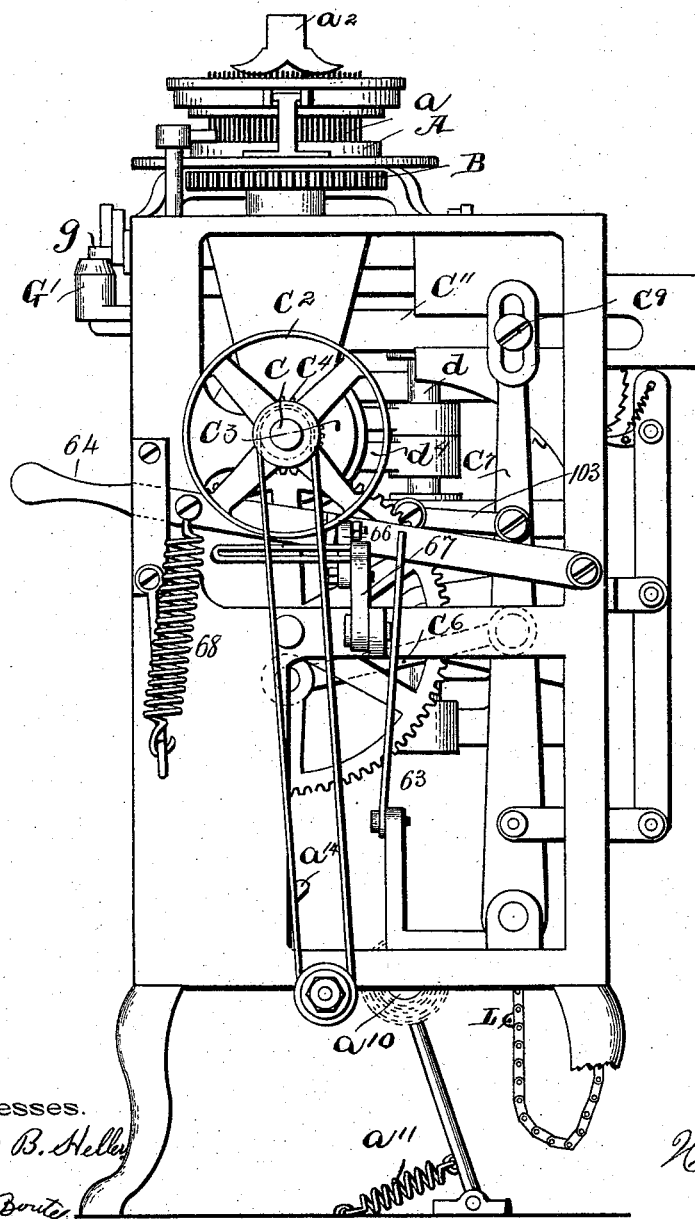
Figure 3:
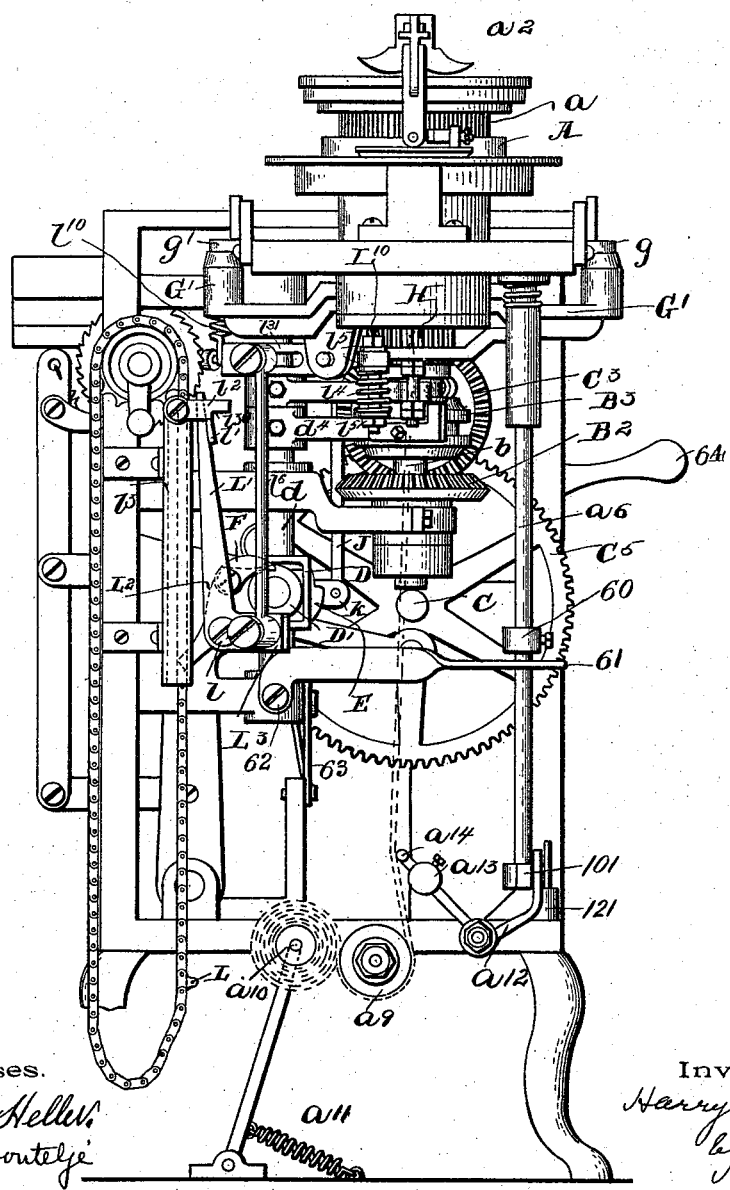
Figure 4:
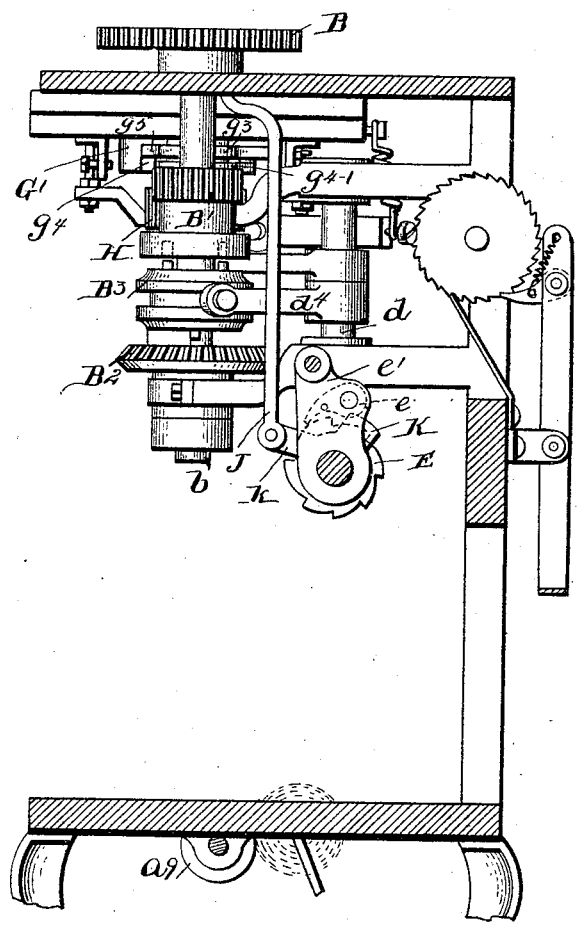
Figure 5:
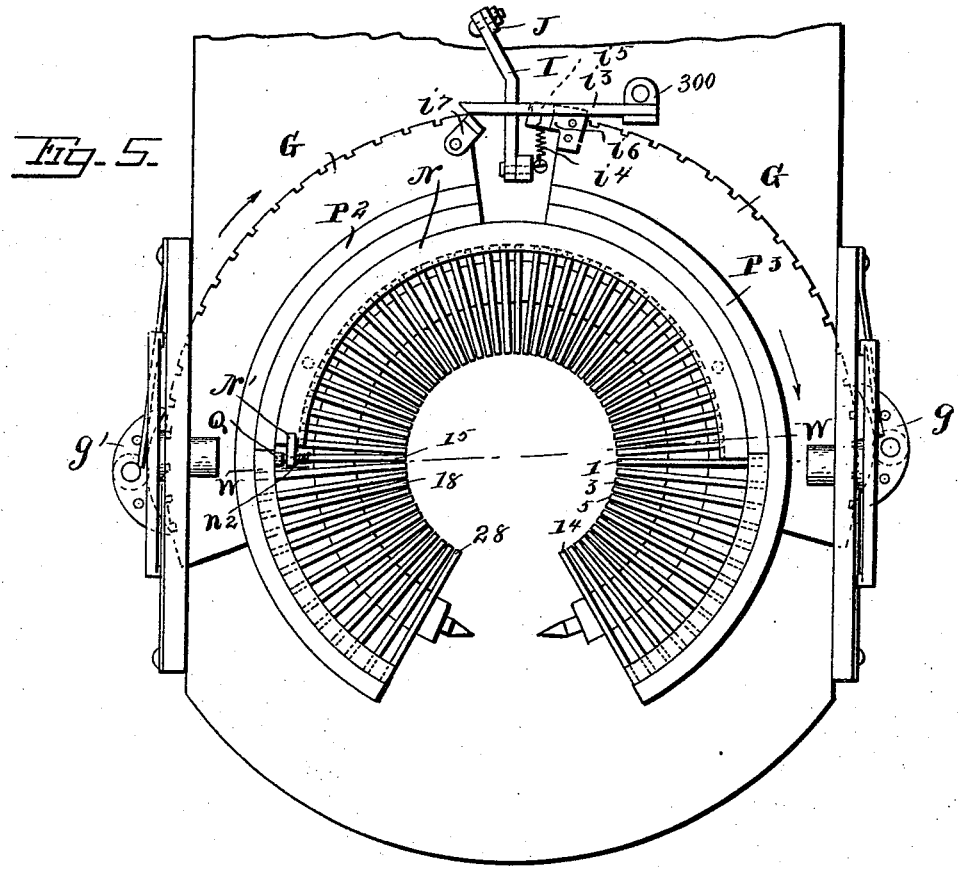
Figure 6:
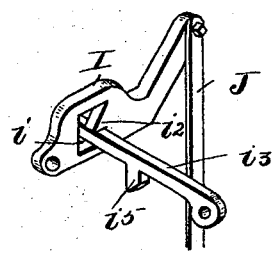

In the drawings, Figure 1 is a front view of my machine. Fig. 1ª is a detailed view of lever 64 and projection 65. Fig. 2 is a side elevation. Fig. 3 is a side elevation at side opposite to that of Fig. 2. Fig. 4 is a section on the line $x\ x$, Fig. 1. Fig. 5 is a plan view of needle-levers and needle-lever feed-motion. Fig. 6 is a perspective view of device for operating upon the change-motion clutch-pawl guard; Fig. 7, a detail view of part of chain. Fig. 8 is a front view of change-motion cam device. Fig. 9 is a side elevation of same. Fig. 10 is a section on line $y\ y$, Fig. 8; Fig. 11, a detail plan of mechanism for operating the fashioning rack-plates; Fig. 12, a section on line $w\ w$, Fig. 5; Fig. 13, a section on line $z\ z$, Fig. 12, with cams spread on a plane; Fig. 14, a detail plan view showing cam-cylinder clutch; Fig. 15, a detail view of forked rod; Fig. 16, a detail view of forked rod and clutch. Fig. 17 is a vertical section through needle-cylinder, showing its connections. Fig. 18 is a perspective view of lug Q. Fig. 19 is a diagrammatic plan view of rack-plates, pawls, and needle-levers. Fig. 20 is a plan view of a rack-plate, pawl, and shifting mechanism. Fig. 21 is a side elevation of same.

A is the cam cylinder; $a$, the needle cylinder; A', the rack plate for operating the cam cylinder. The rack plate and cam cylinder are connected together by a yielding or flexible connection in the following manner: $a^2$ is the thread guide secured to the rack plate, and through this passes the post $a^3$ carrying the spring plunger $a^4$, the spring tending to force the plunger toward the cam cylinder, and when forced into engagement with the projection $a^5$ on the cam cylinder A, under ordinary circumstances, the connection is held between the cam cylinder and plunger $a^4$ due to the force of the spring, so that the rotation or reciprocation of the rack plate A' correspondingly moves the cam cylinder, but when the cam cylinder meets with unusual resistance the spring of the plunger $a^4$ is compressed and the plunger forced away from the cam cylinder releasing the connection of cam-cylinder with rack plate when the cam cylinder is no longer acted on, and a latch $a^{22}$ holds the plunger in this position until the catch is released.

$a^6$ is a post having at its upper end a projection $a^7$ in alignment with the end of plunger $a^4$, when the plunger is forced out of connection with the cam cylinder. Connected to the lower end of this post and normally resting upon the edge of a raised portion 121 of the base of the machine is an arm 101 and a coil spring $a^8$ surrounds a portion of the post $a^6$ secured at one end to a collar on said post and at the other to the frame of machine, so as to be in compression when the bottom of post is resting on said raised portion of base. The lower portion of this post has a collar 60.

61 is a lever pivoted at 62 to the frame of the machine, one end of which lever is in alignment with the collar 60 and adapted to be struck by it when the post $a^6$ is forced off the raised portion of base.

63 is a bell crank, one end of which is in alignment with lever 61, the other end in alignment with hand lever 64, which hand lever rests on a projection 65.

68 is a spring acting upon the hand lever 64.

66 is a link connecting the hand lever and the belt shifting fork 67, the arrangement being such that when the post is on the raised portion of the base the lever 64 is resting on the projection, and the belt shifting fork is in position to hold the belt upon the active pulley, but when the post $a^6$ is moved off the raised portion of the base the collar 60 moves the lever 61, which in turn operates the bell crank 63 which acts upon and forces the lever 64 from the projection 65, and the spring 68 acting upon it moves it, so that through the link 66 the shifting fork 67 is operated, and the belt moved to the idle pulley.

When the connection between the rack plate and cam cylinder is broken as before described, the outer end of the plunger, in the movement of the rack plate, strikes the projection at upper end of post, turning the post so that the arm 101 passes beyond the edge of raised portion of base, and the spring $a^8$ forces the post $a^6$ down, shifting the belt. In order to accomplish this result, if, for any reason, the goods should be disconnected from the machine, I pass the goods around the roller $a^9$, and the roller $a^{10}$, the roller $a^{10}$ having the spring $a^{11}$ to place the desired tension on the goods.

$a^{12}$ is a bell crank, one end resting against arm 101, the other end having a weight, $a^{13}$, and a roller $a^{14}$ resting against the goods. The weight $a^{13}$ is sufficient to pull the arm 101 from the ledge when the weight is allowed to operate, but it is prevented from operating by the goods pressing against the roller, $a^{14}$, and holding that end of the lever up against the weight. If the goods should pass from the needle cylinder it will no longer hold up said lever and the weight, being free to act, will force the arm 101 from the raised surface, and the spring will force the post downward, shifting the belt as before described.

B is a gear which meshes with the teeth of the rack plate A' and by which the rack plate is operated. This gear B is secured upon, so as to rotate with, the vertical shaft $b$. Feathered upon this shaft $b$, midway between the gear B' and bevel gear B², both loose upon the shaft $b$, is the clutch B³, said clutch being adapted to engage either the gear B' or bevel gear B², dependent upon the direction in which it is moved.

The bevel gear B² is given a rotary movement and the gear B' an oscillating movement in the following manner: C is the main driving shaft driven by a belt upon the pulley C', C² being an idle pulley. C³ is a bevel wheel upon the shaft C meshing with the bevel wheel B², and in the rotation of wheel C³ the wheel B² is rotated. Upon the shaft C is the gear C⁴ meshing with the gear C⁵. C⁶ is a rod connecting the gear and the vibratory rod C⁷ pivoted at one end, C⁸. At the other end it is slotted and incloses a pin C⁹ connected to a rack C¹¹ which meshes with the gear B', so that in the rotation of the shaft C the gear B' is given an oscillating movement. Dependent upon which gear, B' or B², is connected to the clutch B³, the gear B will oscillate or rotate causing corresponding movements of the rack plate and cam cylinder. As is well known, in the manufacture, say of hosiery, the rotation of the cam cylinder takes place when the tubular goods (leg and foot) are being made, while the oscillation takes place when some of the needles are thrown out of action and the heel and toe are being formed.

The means by which I accomplish the shifting of the clutch, in the proper manner and at the proper time is as follows: D is a frame connected to rod $d$, which is secured so as to be adapted to slide. This frame D has the upper and lower cam surfaces $d'$, $d^2$; and D' is a cam roller within the frame, the shaft 200 of this roller being supported in bearings 201 and 202 on the back of the machine. The cam roller has a raised portion $d^3$ adapted in its rotation to strike the cam surfaces $d'$, $d^2$, moving the frame and with it the clutch rod $d^4$ connected to rod $d$; the forked end of rod $d^4$ surrounding the clutch B³, thus moving the clutch B³ into engagement with either the wheel B' or bevel wheel B² (dependent upon the direction it is moved).

Motion is given to the cam roller D' in the following manner: Upon the shaft of the cam roller D' is the ratchet E operated by the pawl $e$, and the pawl is operated by being pivoted to the arm $e'$, which arm is pivotally secured to a link 103 which link is connected to the vibratory rod C⁷. See Fig. 1. The ratchet wheel E, as shown in detail Fig. 10, has a number of short teeth, 400, one long tooth $e^2$, and one tooth E³ longer than the short teeth, and shorter than the long tooth. When the machine is knitting tubular work and using all the needles, the pawl rests upon the crown of the long tooth, $e^2$, and the play of the pawl is less than the extent of the crown of said tooth, so the ratchet wheel E is inactive. Running upon a sprocket continuously driven is a sprocket chain, and on this chain at predetermined points are lugs 104 in alignment with the end of a lever X loosely pivoted upon the shaft of ratchet wheel E, and having a dog F, said dog resting in a tooth 100 formed in a collar D×, fast on the shaft of said ratchet wheel and cam roller D', when said roller is in the position to keep the clutch in engagement with the wheel B² and the lugs on the chain being in the position to change the knitting to reciprocating. The ratchet and cam roller, as well as collar are fast on shaft 200. When the lug strikes the lever, the dog operates upon the tooth of collar D×, forcing it, and with it the ratchet wheel E, around a distance sufficient to carry the crown of the tooth $e^2$ beyond the pawl, and the pawl operates upon said tooth and the succeeding ones until again thrown out of action in the manner hereinafter set out, the extent of its operation being sufficient to turn the roller D' until the projection thereon strikes the projection $d'$ on the frame D, moving the frame and rod $d$ changing the clutch from the bevel gear wheel B² to reciprocating gear B', and the cam cylinder is reciprocated.

In Fig. 5, I have shown the fashioning rack plates, G, and the pawls $g$, $g'$, for operating the same to throw the fashioning needles in and out of action, the operation being such as is described in Letters Patent No. 484,738, issued to me October 18, 1892. These pawls are operated in the following manner: The pawls $g$, $g'$, are pivoted one at each end of the lever $G'$, which lever is centrally broadened and encircles a bushing $g^2$ surrounding needle cylinder $a$ and upon which bushing it is adapted to rock.

$g^3$ $g^4$ are projecting arms from the central portion of lever $G'$, and having the rollers, $g^4$, $g^5$, respectively, which rests upon the cam surfaces, $g^6$, $g^7$, respectively, of the cam roller $G^2$. This cam roller has recesses and the gear H loose upon the shaft $h$, which gear meshes with the gear $B'$ on the side opposite to that of the rack, and is of less width than the gear $B'$, has pins adapted to enter these recesses in cam roller. Engaging the hub of gear H is the forked clutch rod $h'$, which is connected to the clutch rod $d^4$ of clutch $B^3$, so as to move with it and bring into engagement the gear H and cam roller $G^2$, when the clutch $B^3$ is engaged with gear $B'$, and disengage gear H from the cam roller, $G^2$, when clutch $B^3$ is engaged with the wheel $B^2$ (see Figs. 1, 15 and 16), so that when the cam cylinder is caused to reciprocate, the fashion rack plate pawls are thrown in action, and are cut out of action when the change is made to rotation of the cam cylinder.

Pivotally connected to the frame of the machine adjacent to the fashion rack plates, is the frame I, which has the slot $i$, and the projection $i^2$ in the slot. In this slot is the loosely pivoted arm $i^3$ pivoted upon a bracket 300 so as to move vertically, and the bracket 300 is pivoted so as to move horizontally, a swivel thereby being formed. The arm $i^3$ is acted upon by the spring $i^4$, which normally holds the arm from under the projection, $i^2$.

J is a link, one end connected to frame I, the other to the tail piece $k$ of the pivoted clutch pawl shield, K, pivoted on the shaft of ratchet wheel E. The shield K is of length sufficient, with the addition of the crown of the tooth $e^3$ in relation to the play of the pawl, to prevent the pawl, when the shield is in its raised position, from striking the operative part of this tooth. The shield is forced down by means of the projection, $i^5$, upon the arm $i^3$, being struck, and the arm moved up against the projection $i^2$ in the slot $i$, by a lug $i^6$, on one of the fashion rack plates which is in position to strike said projection $i^5$ when the said plate is in the position prior to or at the end of the formation of the toe or heel, and this causes the frame I, to rock, elevating link J and tail piece $k$, throwing the shield K out of alignment with the pawl $e$. In order to prevent this being done when one plate only is in the position above described, I use the spring $i^4$, which normally holds the arm $i^3$ from under projection $i^2$. The arm $i^3$ projects beyond the slot $i^2$ in alignment with a lug $i^7$ on the other fashion plate, and which lug is in such position as to strike the arm and force it under the projection when the last tooth of that rack plate is being acted on, and just before the lug $i^6$ strikes the projection $i^5$ on arm $i^3$.

When the machine is initially starting, the pawl $e$ is on the crown of the long tooth, $e^2$, and the clutch $B^3$ is in engagement with the bevel gear $B^2$, and the cam cylinder rotates. This continues until the lug on the pattern chain operates the dog F, causing the cam roller $D'$ and ratchet wheel E to rotate a distance sufficient to enable the pawl to drop into the long tooth, and the ratchet wheel and cam roller are moved by the pawl. The pawl continues to act on the succeeding short teeth until the ratchet wheel and cam roller have made a one-half rotation, when the projection on the cam roller strikes the projection on the frame, moving it, its rod and the clutch $B^3$ into engagement with reciprocating wheel $B'$, and the cam cylinder reciprocates, as before described. This movement of the clutch throws into action the fashion ratchet plate pawls, and the rack plates begin to move to throw the fashion needles one by one out of action. This moves the lug $i^6$ from projection $i^5$, and the arm $i^3$, drops, the spring, moving the arm from under projection $i^2$, and the tail piece $k$, falls, elevating the shield, K, in line with the pawl, $e$. The pawl, $e$, continues to act on the teeth until the tooth, $e^3$, is reached. The length of the crown of this tooth with the shield is sufficient to prevent the pawl acting on the tooth, but in the action upon the previous teeth, the projection upon cam roller, $D'$, has been brought to a position ready to act upon the other projection of the cam frame to return the clutch $B^3$ to the bevel gear $B^2$. The shield prevents the pawl $e$ acting until the rack plates are returned to their initial position, which is at the end of the formation of the heel or toe. When the lugs, $i^5$ and $i^6$, again lift the tail piece $k$, and release the shield, and the pawl acting upon the ratchet brings the clutch into engagement with the bevel wheel $B^2$, and the cam cylinder rotates, this also severs the connection with fashion ratchet pawl mechanism and the rack plates no longer operate. The next tooth to the tooth $e^3$ is the tooth $e^2$, and, as before stated, its crown is so long as to prevent the pawl in its reciprocation from acting on the tooth until the cam roller $D'$ is moved by a lug on the pattern chain. The arrangement for throwing the pawl into action in the change from reciprocation to rotary work, is such as to prevent the change from being made until both fashioning rack plates are in proper position, and, if by any chance, a tooth should be missed in either, then the machine simply goes on knitting heels or toes, and the machine can never be thrown out of time.

I also provide mechanism for fashioning the leg of the stocking, which is as follows:

On the back side of the pattern chain and in proper position, is a lug L, which is in alignment with one arm $L'$, of a bell crank lever $L^2$, pivoted at $l$ to the frame of machine. The arm L' inclines toward the chain from its pivot point, and has at its upper end a pin, l'.

l² is a latch pivoted to and projecting from a standard l³, and having the notched end l³⁰. When the lug strikes the arm L', and as it travels upward, the arm is gradually moved outward, and when the pin has reached beyond the latch, it is caught, preventing the return of the arm L', until the second lug 105 on the pattern chain lifts the latch and the weight of the arm returns it to its initial position.

The needle cylinder is supported on the rod $L^{10}$, upon which rod are the washers $l^5$, between the upper two of which is connected the lever $l^{31}$. Between this lever and the bottom washer $l^5$, is the spring $l^4$. The end of this lever $l^{31}$ is slotted. A link $l^6$ is connected at one end in the slot of lever $l^{31}$, and at the other end to short arm $L^3$ of bell crank $L^2$ of which L' is the long arm. The spring $l^{10}$ secured to the frame of the machine acts against the rear end of lever $l^{31}$ to hold it normally in such position that the needle cylinder is normally down. (See Figs. 17 and 3.) When the lug L strikes the arm L' and moves upward, the arm is gradually forced outward, gradually elevating the needle cylinder and loosening the stitches, thereby gradually increasing the size of tubular goods, and the arm L' will be held at the greatest increased size by the latch.

By changing the inclination of lever L' the fashioning can be made more or less gradual, and by changing the position of latch $l^2$ the extent of the widest portion can be varied.

In the formation of the heel and toe of a stocking the mechanism for operating the pawls $g$, $g'$, is thrown into action, the pawls being, as shown, double pawls, one end of each pawl acting to move its corresponding plate in one direction, and the other end to move its corresponding plate in the other direction. Speaking generally, alternately the pawls act upon their corresponding rack plates to which are connected the fashioning cams, first moving the rack plate in one direction until the desired number of fashioning needles are thrown out of action, then the pawls are turned so that the other end acts to throw said needles again into action one by one, as is shown and described in a previous patent issued to me, No. 484,738; also shown in Figs. 19, 20 and 21 of this application. Each pawl $g$ and $g'$ has the pins 40, 41, and springs 42, 43, are adapted to act against the pins, 40, 41, respectively, and, dependent upon which pin is acted upon by its spring, one end or the other of the pawl is active.

$q^4$ is a centrally pivoted lever having projections $q^5$, $q^6$, one at each end, and in alignment of movement with the springs 42, 43, respectively. Dependent upon the position of this lever $q^4$, the spring which acts upon its corresponding pin is controlled. Upon the rack plates G, at points corresponding to each end of its desired limit of travel, are placed the projections $q^7$, $q^8$, and when the plate has been moved in either direction to its desired limit, the corresponding projections $q^7$ or $q^8$ tilts the lever $q^4$, causing the projection $q^5$ or $q^6$ to throw the spring in action out of action, and the other into action, thus reversing the pawl. Now, starting at the beginning of the heel or toe, the plates will be in the position shown in Fig. 19, and confining the description to the manner of operation, which existed prior to my improvement in this operation, which will hereinafter be described it is seen that needles 1 to 14 are the fashioning needles on one side controlled by the right hand rack plate G, needles 15 to 28 being the needles controlled by the left hand rack plate G, and the movements of each rack plate at starting being as shown by full arrows. The first movement causes the right hand pawl $g$ to move its rack plate G so as to throw out of action fashioning needle No. 1. At the same time left hand pawl $g'$ moves in the opposite direction, to enable it in the next movement to act on a tooth, and in this next movement operates its rack so as to throw out of action needle No. 15, or the first needle on its side. The operation now continues, pawl $g$ and pawl $g'$ alternately throwing out of action the needles, pawl $g$ throwing out needle 2, then pawl $g'$ throwing out needle 16, pawl $g$ throwing out needle 3, then pawl $g'$ throwing out needle 17, until, when the pawl $g$ has moved a sufficent number of teeth to throw out the last needle on its side, to wit: needle 14, its rack plate has reached the desired limit of its travel in one direction, and by the mechanism before described the pawl is turned and the same thing occurs with reference to pawl $g'$ when it has operated to throw out of action needle No. 28. Then the pawls alternately throw into action the needles previously thrown out, the plates moving in the direction of the dotted arrows. As may be seen from this operation, at the end of the period when the pawl $g$ is acting to throw its needles into action, that is, during the movment of the pawl $g$ to throw No. 1 needle into action, the pawl $g'$ is drawn back so as to prepare for throwing needle 15 into action. With the movement by which pawl $g$ throws needle No. 1 into action by the mechanism hereinbefore described, it is simultaneously turned, its corresponding plate having reached the limit of its travel. Therefore, if we were to allow pawl $g'$ to rack in needle No. 15, the same movement would cause the pawl $g$ (it having turned) to rack out needle No. 1, so that in any event, when the circular knitting takes place, one needle on either one or the other side would be out of action and held out of action by the cam of the rack plate, which controlled the needle; and therefore, the yarn, so far as that needle is concerned, in the circular knitting would merely wind upon the needle without forming a stitch, and merely form a lump and spoil the fabric. In order to obviate this, the common practice is, during the action of pawl $g$ to rack needle No. 1 into action to throw needle No. 15 into action by means of mechanism which will strike its rack plate, moving it independently of the pawl, the rack plate being capable of independent movement. This therefore leaves at the end of the formation of the heel or toe, the rack plates in the position which they would be in if needle 15 had been thrown into action by the pawl $g'$. This movement of the rack plate will also turn the pawl $g'$ so that it will be ready and in such position that the first operative movement that it will have will be to move its rack plate to throw out the needle 15.

A certain improvement, which I am now about to describe, has for its object the making of the proper number of stitches during the formation of the heel and toe, and at the conclusion having all the needles in action, it being essential that the first course in the formation of the heel and toe shall be with all the fashioning needles excepting the first one thrown out of action, and, at the end of the formation, all of the fashioning needles shall be brought into action, and while this is accomplished in machines heretofore, still it requires complicated mechanism adapted at the proper time to strike the rack plate on one side; and the purpose of my improvement is to accomplish this in a simpler manner. Speaking generally, it consists in having one of the fashioning needles controlled by the plate, which automatically throws the non-fashioning needles out of action at the beginning of knitting the heel and toe, and providing mechanism connected to the rack plate corresponding to this needle which at the initial operation will throw this needle into action, instead of, as in the ordinary case, in the initial operation throwing it out of action, that is, the rack plates on both sides are at the beginning simultaneously acted on, and the arrangement is such that the first action of the rack plate on one side is to throw in a needle, and on the other side to throw out a needle instead of both plates initially acting alternately, and both initially throwing out needles, as is now done. I accomplish this by the mechanism which is shown in Figs. 5, 12, 13, 17 and 18. The fashioning needles are numbered 1 to 28, 1 to 14 on one side, and 15 to 28 on the other side. To the rack plates G are connected the fashioning needle operating cams $P^2$ $P^3$, and N is the plate for throwing the non-fashioning needles in and out of action. The fashioning needles, with the exception of No. 15, are provided with long levers which are acted upon by the cams $P^2$ $P^3$ as in Letters Patent No. 484,738, the cams acting in one direction of the movement of the plate to move the needle operated on out of action, and in the other direction into action. The lever of needle No. 15 is shorter than the levers of the remainder of the needles. Projecting from the plate N is the piece $n$, which rests on the lever of needle 15, and holds the needle in action when the plate is down. Connected to said plate is the angular piece $N'$ to which one end of the spring $n^2$ is connected, the other end of the spring being connected to the lever of needle 15, and the projecting piece $n$ holds the lever against the action of the spring $n^2$, so that when the plate N moves upward and lifts the projecting piece off of the lever the spring $n^2$ moves the lever and throws the needle out of action. Upon the rack plate G, corresponding to needles 15 to 28, is the lug Q (Figs. 5, 12 and 8) out of alignment with the fashioning cam $P^2$, but in alignment with the lever of needle 15, the lever of needle 15 being out of alignment with the fashioning cam $P^2$. This lug Q is constructed so as to operate upon the lever to throw the needle into action. At the beginning of the heel or toe the plate N, as described in Patent No. 484,738, is lifted to throw the non-fashioning needles out of action (the pawls $g$, $g'$, being as shown in Fig. 5) and through the medium of spring $n^2$, the needle 15 is thrown out of action. The first movement of the fashioning rack plates is such that the movement of the plate of needles 1 to 14 is forward in the direction of its arrow Fig. 5, and that of the needles 15 to 28 is in the direction of its arrow Fig. 5 so that the lug Q operates upon the lever of needle 15, throwing said needle into action and working a stitch into that needle; also the pawl of that plate is turned, and when the pawl of the other plate is being drawn back to operate upon its next tooth, the pawl of plate of needles 15 to 28 acts upon the rack plate to move it in the direction opposite to its arrow in Fig. 5, moving lug Q away from the lever of needle 15, and the spring $n^2$ throws it out of action. From this it may be seen that in my construction, at the initial movement, the pawl $g'$ is in the position to move the rack plate in a direction opposite to that which the pawl $g$ is arranged to move its rack plate, which differs from that previously described as the position at the beginning of the operation in the prior art, and of course at the end of the formation of the heel and toe the pawls are left in the position in which they are shown in Fig. 5.

The difference therefore between the operation of my mechanism and that of the prior art consists in the following: While in the prior art the first operation in the formation of the heel and toe of both the pawls $g$ and $g'$ is to throw out of action needles, the first action of one of my pawls is to cause a needle to be thrown into action. Therefore when the machine changes to reciprocating work in my construction the action of plate N not only throws out of action the non-fashioned needles, but also one of the fashioning needles, and the first action of the rack corresponding to that needle is to bring said needle into action, while the rack on the other side is throwing a needle out of action, and at once moves so as to allow it to go out of action, and at the end of the reciprocating work this needle, by the movement of plate N, is with the non-fashioning needles thrown into action. So far as the position of the yarn guide is concerned, during circular work it is rotating to the left (against the hands of a watch), and at the time of change to reciprocating work it is at the center front of the machine, and then moves in the same direction to the center back, from which point it is reciprocated to the right until it again reaches the center back, then to the left until it reaches the center back, and so on until the reciprocating work is completed. So far as the fashioning needles are concerned, the first operation knits a stitch on all the fashioning needles on the right side. The rack plate on the right side then racks a needle out, and the rack plate on the left racks the needle 15 in action, and on the return of the yarn guide, so far as the right hand fashioning needles are concerned, one is out of action, but a stitch is knit upon all the left hand fashioning needles. On the movement of the yarn guide from the last position, one of the needles on the left hand side is out of action, while on the right the same number as before are in action. Thus summarizing, taking fourteen needles on each side, in the first movement of the yarn guide fourteen stitches are knit on the right side, next movement thirteen on the right and fourteen on the left, next movement thirteen on the left and thirteen on the right, next movement thirteen on the right and thirteen on the left, next movement twelve on the left and twelve on the right, and so on until the yarn guide is about to move to right from back with two needles up on right and two on left. Then it is as follows: One stitch on right, two on left, one on left, one on right, none on the right, one on the left, none on the left, one on the right, (the right hand pawl having turned in racking out needle No. 14,) then one on right, one on left (left hand pawl having been turned), then one on left and two on right and so on until thirteen needles are up on right and thirteen on left, when in racking needle No. 1 on the right into action the machine changes and simultaneously the needle 15 is brought into action by action of plate N, and the yarn guide, being at the back of the machine, commences to continuously rotate toward the left, as it was doing prior to going into reciprocating work.

Having now fully described my invention, what I claim, and desire to secure by Letters Patent, is—

1. In combination with the cam cylinder and gear for operating the same, a shaft, a gear upon said shaft meshing with the cam cylinder gear, a rotating gear, and an oscillating gear operating independently of said shaft, a clutch fastened upon said shaft, a cam roller, a connection between said cam roller and clutch, a ratchet for operating said cam roller, a pawl to operate said ratchet, means to reciprocate said pawl, said ratchet being provided with a tooth the crown of which is longer than the throw of the pawl, a tooth moving with the cam roller, a dog adapted to strike said tooth, a pattern chain, a lug on the pattern chain in alignment with the heel of said dog, the arrangement being such that when the lug strikes the dog the cam roller is turned, turning the ratchet wheel a distance sufficient to allow the pawl to engage the long tooth.

2. In combination with the cam cylinder and gear for operating the same, a shaft, a gear upon said shaft, meshing with the cam cylinder gear, a rotating gear, and an oscillating gear operating independently of said shaft, a clutch fastened upon said shaft, a cam roller, a connection between said cam roller and clutch, a ratchet for operating said cam roller, a pawl to operate said ratchet, means to reciprocate said pawl, fashioning needle rack plates, pawls for operating the same, and connections between said plates and the pawl first mentioned whereby in the movement of the plates said pawl is rendered inactive, and at the end of said movement rendered active.

3. The combination with the cam cylinder and gear for operating the same, a shaft, a gear upon said shaft, meshing with the cam cylinder gear, a rotating gear and an oscillating gear operating independently of said shaft, a clutch fastened upon said shaft, a cam roller, a connection between said cam roller and clutch, a ratchet for operating said cam roller, a pawl to operate said ratchet, means to reciprocate said pawl, fashioning needle rack plates, pawls for operating the same, a pivoted lever, a projection upon one of the plates adapted to strike said lever, a shield, adapted to render the pawl of cam roller ratchet inactive, and a connection between said shield and the pivoted lever whereby when the lever is struck by the lug the shield is rendered inactive.

4. In combination with the cam cylinder and gear for operating the same, a shaft, a gear upon said shaft, meshing with the cam cylinder gear, a rotating gear, and an oscillating gear operating independently of said shaft, a clutch fastened upon said shaft, a cam roller, a connection between said cam roller and clutch, a ratchet for operating said cam roller, a pawl to operate said ratchet, means to reciprocate said pawl, fashioning needle rack plates, pawls for operating the same, a pivoted lever, a frame provided with a slot into which said lever passes, a projection upon the plate adapted to strike said lever, a shield adapted to render the pawl of cam roller inactive and a connection between said frame and shield whereby when the lever is struck by the lug the shield is rendered inactive.

5. In combination with the cam cylinder and gear for operating the same, a shaft, a gear upon said shaft meshing with the cam cylinder gear, a rotating gear, and an oscillating gear operating independently of said shaft, a clutch fastened upon said shaft, a cam roller, a connection between said cam roller and clutch, a ratchet for operating said cam roller, a pawl to operate said ratchet, means to reciprocate said pawl, fashioning needle rack plates, pawls for operating the same, a pivoted lever, a frame provided with a slot through which said lever passes, a projection on the frame in said slot, a spring adapted to keep said lever from under said projection, a projection on one of said plates adapted to strike and raise said lever, and a projection on the other plate adapted to strike said lever and force it under the projection in the slot of the frame, a cam roller ratchet shield and a connection between said frame and shield.

6. In combination with the cam cylinder and gear for operating the same, a shaft, a gear upon said shaft meshing with the cam cylinder gear, a rotating gear and an oscillating gear operating independently of said shaft, a clutch fastened upon said shaft, and means to shift said clutch into engagement with either the reciprocating or rotary gear, a rack plate, and pawls for operating the same, pawl operating mechanism, a reciprocating gear for driving said pawl operating mechanism, mechanism adapted to cause the last mentioned reciprocating gear to engage the pawl operating mechanism, said mechanism being connected to and moving with the first mentioned clutch, the arrangement being such that when the first mentioned clutch is moved into engagement with the reciprocating gear, the last mentioned reciprocating gear is thrown into engagement with the pawl operating mechanism, and in the other movement of the main clutch said reciprocating gear is released from engagement with the pawl operating mechanism.

7. In combination with the cam cylinder and gear for operating the same, a shaft, a gear upon said shaft meshing with the cam cylinder gear, a rotating gear and an oscillating gear operating independently of said shaft, a clutch fastened upon said shaft, and means to shift said clutch into engagement with either the reciprocating or rotary gear, a rack plate and pawls for operating the same, a pivoted lever to which said pawls are secured, a double opposite faced cam roller, one cam face being adapted to operate one end of said lever, and the other face the other end of said lever, a reciprocating gear for driving said cam roller, mechanism adapted to engage and disengage the gear and cam roller, said last mentioned mechanism being connected to and moving with the first mentioned clutch, the arrangement being such that when the first mentioned clutch is moved into engagement with the reciprocating gear, the cam roller is operated by the reciprocating gear, and in the other movement of the main clutch the cam roller is released from being operated by said reciprocating gear.

8. In combination with the cam cylinder and gear for operating the same, a shaft, a gear upon said shaft meshing with the cam cylinder gear, a rotating gear, and an oscillating gear operating independently of said shaft, a clutch fastened upon said shaft, a clutch cam roller, and a connection between said roller and the clutch whereby in the movement of the roller one half turn the clutch is moved in one direction into engagement with one of the gears and in the other half turn is moved in the other direction into engagement with the other gear, a ratchet wheel on the shaft of said roller, a reciprocating pawl adapted to operate said ratchet wheel, there being a tooth of said ratchet the crown of which is of greater length than the throw of the pawl, a pivoted shield, a second tooth of length less than the throw of said pawl, a tooth moving with the cam roller, and a dog resting in said tooth, a pattern chain a lug on the pattern chain in alignment with said dog and adapted to strike and revolve said roller and said ratchet a distance sufficient to render the pawl upon the long tooth active, a pivoted lever and a connection between said lever and the shield, fashion needle rack plates and pawls for operating the same, and a projection on one of said plates adapted to strike said last mentioned lever, and render the shield inactive, the relation of the cam ratchet wheel and the various parts being such that the pawl is on the long tooth when the lug of the pattern chain operates to move the clutch, to cause the cam cylinder to reciprocate and upon the second tooth which co-acts with the shield when the ratchet is about to reverse the clutch.

9. In combination with the needle cylinder of a knitting machine, said cylinder being secured so as to be movable vertically, a pattern chain, a lug upon said pattern chain, a pivoted lever inclined toward the pattern chain, said lever being in line of movement of said lug on the pattern chain, and connections between said lever and the needle cylinder, the connections being such that when the lug strikes the lever the needle cylinder is moved vertically.

10. In combination with the needle cylinder of a knitting machine, said cylinder being secured so as to be movable vertically, a pattern chain, a lug upon said pattern chain, a pivoted lever inclined toward the pattern chain, said lever being in line of movement of said lug on the pattern chain and connections between said lever and the needle cylinder, the connections being such that when the lug strikes the lever the needle cylinder is moved vertically, and a catch adapted to prevent the return of said lever.

11. In combination with the needle cylinder of a knitting machine, said cylinder being secured so as to be movable vertically, a pattern chain, a lug upon said pattern chain, a pivoted lever inclined toward the pattern chain, said lever being in line of movement of said lug on the pattern chain, and connections between said lever and the needle cylinder, the connections being such that when the lug strikes the lever the needle cylinder is moved vertically, a catch adapted to prevent the return of said lever, and another lug in line with said catch and adapted when it strikes said catch to release the lever.

12. In combination with the needle cylinder of a knitting machine, said cylinder being secured so as to be movable vertically, a spring to resist said movement, a pattern chain, a lug upon said pattern chain, a pivoted lever inclined toward the pattern chain, said lever being in line of movement of said lug on the pattern chain, and connections between said lever and needle cylinder, the connection being such that when the lug strikes the lever the needle cylinder is moved vertically.

13. In combination with the cam cylinder and rack plate of a yielding connection between the same, a belt shifter and devices between said yielding mechanism and the belt shifting mechanism, and adapted to be engaged by the yielding mechanism said devices being such that when the connection between the cam cylinder and rack plate is severed, the belt is shifted on the idle pulley.

14. In combination with the cam cylinder and rack plate, a spring plunger carried by the rack plate and adapted to make connection between the rack plate and cam cylinder, a post adapted to be moved by said plunger when it is released from the cam cylinder, and a connection between said post and the belt shifting mechanism, the connection being such that when the post is moved by the plunger, the belt is shifted to the idle pulley.

15. In combination with the cam cylinder and rack plate, a spring plunger carried by the rack plate and adapted to make connection between the rack plate and cam cylinder, a post adapted to be moved by said plunger when it is released from the cam cylinder, said post normally resting upon a raised portion of the base, a spring tending to force said post downward, and a connection between said post and the belt shifting mechanism, the connection being such that when the post is moved by the plunger, the belt is shifted to the idle pulley.

16. In combination with the fashioning needle 15, provided with a lever, the fashioning rack plate corresponding to said needle, pawls for operating the same, and the non-fashioning needle plate N, a projection from said plate N, adapted to rest upon the lever of said needle when said plate is down, a spring acting upon said lever in the opposite direction to the projection and adapted to move said lever when relieved from the projection, of a lug connected to said rack plate in alignment with said lever and constructed to move said lever in a direction opposite to the spring.

17. In combination with the fashioning needle 15 provided with a lever, the fashioning rack plate corresponding to said needle, pawls for operating the same, and the non-fashioning needle plate N, a projection from said plate N adapted to rest upon the lever of said needle when said plate is down, an angular projection from said plate, a spring having one end connected to said angular projection, the other connected to said lever, and a lug connected to said rack plate, in alignment with said lever, and constructed to move said lever in a direction opposite to the spring.

18. In combination with the fashioning needles provided with levers and rack plates corresponding to said needles, cams carried by said plates adapted to operate upon the levers of said needles, the lever of one of said needles being out of alignment with said cams, and a device connected with said rack plate adapted in the movement of said plate to operate upon the lever of said needle for the purpose described and means to move said needle out of action.

19. In combination with the fashioning needles provided with levers and non-fashioning needles, a device adapted to throw out of action the non-fashioning needles, and means to move one of the fashioning needles out of action when said device is operated to throw the non-fashioning needles out of action, rack plates corresponding to said fashioning needles, cams carried by said plates adapted to operate upon the levers of said fashioning needles, with the exception of the needle controlled by the non-fashioning needle device, and a device independent of the cams moved by the rack plate and adapted in the movement of the rack plate in one direction to move said last mentioned needle into action, and in the other direction allow it to go out of action, said last mentioned fashioning needle being normally out of action in the fashioning.

20. In a circular knitting machine, in combination with fashioning and non-fashioning needles, a device adapted to move the non-fashioning needles out of action at predetermined points in the operation of the machine, means to throw out of action one of the fashioning needles when said device is operated to throw the non-fashioning needles out of action, and means to throw said needle into action again, substantially as and for the purpose described.

In testimony of which invention I have hereunto set my hand.

HARRY A. HOUSEMAN.

Witnesses:
GUERNSEY A. HALLOWELL,
FRANCIS REILEY, Jr.